United States Patent
Vangsgard et al.

(10) Patent No.: US 6,354,615 B1
(45) Date of Patent: *Mar. 12, 2002

(54) VEHICLE HAVING A TORSIONAL SUSPENSION AND TORSIONAL JOINT

(75) Inventors: Kip S. Vangsgard, White Beark Lake; Richard T. Cairns, Wayzata; Rodney W. Woock, Kenyon; Dennis J. Berndt, Eagan, all of MN (US)

(73) Assignee: The Toro Company, Bloomington, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,535

(22) Filed: Feb. 8, 1999

(51) Int. Cl.$^7$ .............................. B60G 11/23; B60G 3/06
(52) U.S. Cl. ......................... 280/124.111; 280/124.13; 280/124.137; 280/124.102; 280/124.167; 280/124.169; 280/124.177; 280/788; 280/483
(58) Field of Search ................................ 280/124, 134, 280/124.167, 124.169, 124.177, 124.13, 124.137, 124.101, 124.102, 124.111, 788, 483, 400, 408, 486, 124.113; 267/274, 277, 279, 281

(56) References Cited

U.S. PATENT DOCUMENTS

| 1,886,319 A | 11/1932 | Cohen-Venezian | |
| 1,919,033 A | 7/1933 | Noble | |
| 2,226,406 A | 12/1940 | Krotz | 267/21 |
| 2,344,072 A | 3/1944 | Winkelmann | 180/73 |
| 2,345,201 A | 3/1944 | Krotz | 267/21 |
| 2,366,166 A | 1/1945 | Willock | |
| 2,393,324 A | 1/1946 | Joy | |

(List continued on next page.)

*Primary Examiner*—Lanna Mai
*Assistant Examiner*—Ruth Ilan
(74) *Attorney, Agent, or Firm*—Mau & Krull, P.A.

(57) ABSTRACT

An articulating vehicle (10) includes a front axle (21) operatively connected to a front frame (40) and a rear axle (21) is operatively connected to the rear frame (30). A torsional joint (50) has an inner shaft member (51) operatively connected one of the frames and an outer hollow member (52) operatively connected to the other of the frames. An elastomeric material (53) is positioned between the inner member (51) and outer member (52). The elastic material (53) connects the inner and outer members, whereby the frames may rotate relative to each other along the longitudinal axis as the elastomeric member (53) is compressed and resiliently resists rotation between the frames (30 and 40). A torsional energy absorption suspension is provided for one of the wheels. The suspension includes a torsional joint (50), a single A-frame member (94). A lever arm (95) may also be utilized to vary the preload on the torsional joint (50).

4 Claims, 11 Drawing Sheets

U.S. PATENT DOCUMENTS

| | | | |
|---|---|---|---|
| 2,824,750 A | * | 2/1958 | De Lorean .................. 280/788 |
| 2,838,124 A | * | 6/1958 | Cramer, Jr. ........... 280/124.111 |
| 2,925,264 A | * | 2/1960 | Loehr .................. 280/124.137 |
| 3,045,774 A | | 7/1962 | Hadlock |
| 3,057,319 A | | 10/1962 | Wagner |
| 3,134,607 A | | 5/1964 | Doll |
| 3,159,229 A | | 12/1964 | Thwaites |
| 3,189,117 A | | 6/1965 | Ammon |
| 3,199,486 A | | 8/1965 | Gillois et al. |
| 3,240,284 A | | 3/1966 | Finneman |
| 3,276,532 A | | 10/1966 | Yonkers |
| 3,281,161 A | | 10/1966 | Anderson ................... 280/476 |
| 3,292,943 A | | 12/1966 | Crockett ..................... 280/104 |
| 3,338,327 A | | 8/1967 | Bishop ........................ 180/71 |
| 3,360,067 A | | 12/1967 | Scott |
| 3,414,072 A | | 12/1968 | Hodges, Jr. et al. |
| 3,426,720 A | | 2/1969 | Enos |
| 3,428,142 A | * | 2/1969 | Kraus et al. .......... 280/124.111 |
| 3,437,163 A | | 4/1969 | Lemmerman |
| 3,498,488 A | | 3/1970 | Wildey et al. .............. 214/523 |
| 3,520,554 A | | 7/1970 | Ravenel ..................... 280/124 |
| 3,525,539 A | * | 8/1970 | Illar .......................... 280/483 |
| 3,545,737 A | | 12/1970 | Lamprey ................... 267/141 |
| 3,568,788 A | | 3/1971 | Mayeaux |
| 3,605,929 A | | 9/1971 | Rolland ....................... 180/26 |
| 3,635,302 A | | 1/1972 | Rogers et al. |
| 3,669,469 A | | 6/1972 | Hartelius |
| 3,741,329 A | | 6/1973 | Davis et al. .............. 180/89 R |
| 3,770,291 A | | 11/1973 | Kramer ...................... 280/124 |
| 3,770,294 A | | 11/1973 | Hammer |
| 3,779,576 A | | 12/1973 | Malcolm .................... 280/124 |
| 4,034,822 A | | 7/1977 | Stedman |
| 4,043,571 A | | 8/1977 | Guerbet ...................... 280/716 |
| 4,079,955 A | | 3/1978 | Thorpe et al. |
| 4,273,353 A | * | 6/1981 | Holmes ...................... 280/483 |
| 4,635,958 A | * | 1/1987 | Yonemoto ............ 280/124.137 |
| 4,778,199 A | * | 10/1988 | Haggerty et al. ........... 267/279 |
| 4,809,489 A | | 3/1989 | Johansson |
| 5,326,326 A | | 7/1994 | Cunard et al. .............. 472/118 |
| 5,411,287 A | | 5/1995 | Henschen |
| 5,685,527 A | * | 11/1997 | Harbali et al. .............. 267/277 |
| 5,855,386 A | * | 1/1999 | Atkins .................. 280/124.111 |
| 5,921,338 A | | 7/1999 | Edmondson ............... 180/65.5 |
| 5,921,568 A | * | 7/1999 | Cruise et al. ......... 280/124.134 |
| 5,921,569 A | * | 7/1999 | Noutomi et al. ...... 280/124.167 |
| 6,003,888 A | | 12/1999 | Godbersen .................. 280/124 |

\* cited by examiner

VEHICLE HAVING A TORSIONAL SUSPENSION AND TORSIONAL JOINT

BACKGROUND OF THE INVENTION

1. Field of the Invention

The present invention relates generally to a suspension for a vehicle, and more particularly to a utility vehicle which utilizes a torsional energy-absorbing member and also may utilize a torsional joint to make the vehicle articulating.

2. Description of the Prior Art

Utility vehicles for use in agricultural, lawn and golf course maintenance fields typically travel directly upon the turf surface being maintained. Such vehicles must often support a substantial weight on a frame. Inherent in such applications is the need to travel over uneven terrain, freshly watered grass or recently planted soil. Obstacles such as shrubbery, sand traps and trees are also often encountered.

Utility vehicles of this type are often used to apply fertilizer, pesticides or other surface treatment to turf being maintained. In order to prevent damage to the turf and to promote safety while turning in off-road environents, maximum speed of many utility vehicles is limited to approximately 15–25 miles per hour. Unfortunately, this encourages the tendency to drive at maximum speed under most conditions, including going over and around obstacles.

It is preferable that scuffing of the turf or soil does not occur while the vehicle is in motion. Despite the terrain, it would be advantageous to keep all four wheels on the ground. This would help maintain the traction of the vehicle, increase the vehicle's stability and maintain constant ground pressure. Simply suspending the wheels from the axle does not provide sufficient latitude as the terrain is often more uneven than the suspension system is able to compensate for. Further, the suspension systems are quite complex and there are a number of parts that may wear as the vehicle is continually used.

Another important consideration when designing a utility vehicle is the ride and comfort of the driver and passenger. Typically, past utility vehicles have had the cab of the utility vehicle connected to the rear frame in such a manner that movement of the rear wheels is transferred to the cab in which the operator sits.

The present invention addresses these problems and provides for a utility vehicle with a torsional suspension system which is less complex and requires less maintenance. Further, the vehicle may articulate along its longitudinal axis and also provides for a utility vehicle which separates the motion of the rear wheels from the passenger cab.

SUMMARY OF THE INVENTION

The present invention is a torsional energy suspension for a utility vehicle having a wheel. The suspension includes a torsional energy absorption member having an inner shaft member, an outer hollow member an elastomeric material operatively connecting the inner and outer members. An A-frame has a first end operatively connected to a wheel and a second wheel operatively connected to one of the members, the other of the members operatively connected to the frame. A lever arm has a first end connected to the other of the members and a second end adapted to be connected to the frame. The second end of the lever arm is adapted to be secured in a plurality of positions on the frame, wherein a varying preload may be created by simply securing the lever arm to a different position.

The invention is also a torsional energy absorption suspension for a utility vehicle having a frame, wheel and longitudinal axis. The suspension includes a torsional energy absorption member having an inner shaft, an outer hollow member and an elastomeric material operatively connecting the inner and outer members. The absorption member has a longitudinal axis which extends generally from the front of the vehicle to the rear of the vehicle. An A-frame has a first end operatively connected to a wheel and a second end operatively connected to one of the members, the other of the members operatively connected to the frame. The A-frame consisting essentially of a single member.

The invention is also a utility vehicle having a longitudinal axis. A front axle is operatively connected to the front frame and a rear axle is operatively connected to a rear frame. A torsional energy absorption member has an inner shaft member, an outer hollow member, and an elastomeric material operatively connecting the inner and outer members. An A-frame has a first end operatively connected to a wheel and a second end operatively connected to one of the members, the other of the members operatively connected to a frame. A lever arm has a first end operatively connected to the other of the members and a second end adapted to be connected to the frame. The second end of the lever arm is adapted to be secured in one of a plurality of positions on the frame, wherein a varying preload may be created by simply securing the lever arm to a different position. In a preferred embodiment, the vehicle also includes a torsional joint having an inner shaft member operatively connected to one of the frames and an outer hollow member operatively connected to the other of the frames. An elastomeric material is positioned between the inner and outer members of the torsional joint. The elastomeric material operatively connects the inner and outer members, whereby the frames may rotate relative to each other along the longitudinal axis as the elastomeric member is compressed and resiliently resists rotation between the frames.

DETAILED DESCRIPTION OF THE PREFERRED EMBODIMENTS

Figure 2:
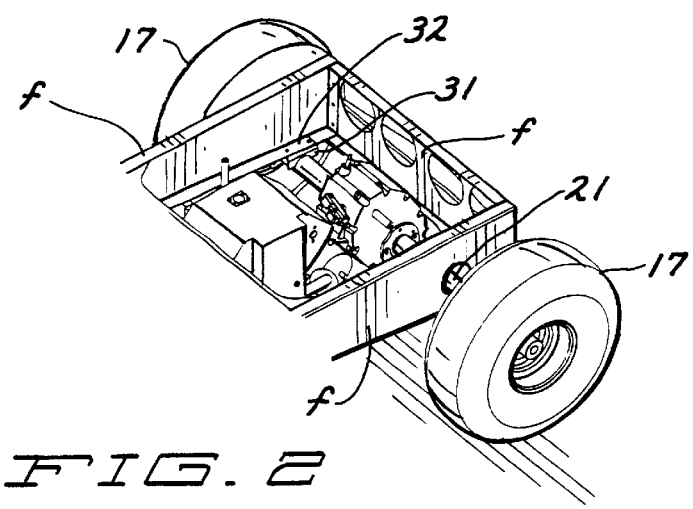
FIG. 2 is a perspective view of the rear of the vehicle of FIG. 1 with the payload platform removed.

Referring to the drawings, wherein like reference numerals represent like parts throughout the several views, there is generally shown at 10 a utility vehicle. The vehicle 10 includes a cargo bed or payload platform 11. The payload platform 11 is operatively connected to a rear frame 30, which will be described more filly hereafter. The payload platform 11 may be secured to the rear frame 30 by suitable means such as bolts and nuts, welding or other means well known in the art. Preferably the platform is hinged to allow for dumping. An operator platform 12 is operatively connected to a front frame 40, which will be more fully described hereinafter. The operator platform 12 is suitably connected by bolts and nuts, welding or other means well known in the art to the front frame 40. Positioned on and carried by the operator platform 12 is a passenger seat 13 and operator seat 14. A front hood and fender assembly 15 is also operatively carried by the front frame 40. A prime mover, such as an internal combustion engine 16 is mounted to the rear frame 30 and drives, in this case, rear wheels 17. The front wheels 18 could also be driven, and the present invention is applicable for use in conjunction with either the rear wheels or the front wheels, regardless of whether the vehicle is front-wheel, rear-wheel or all-wheel drive. Steering of the vehicles controlled by conventional manipulation of a steering wheel 19 which is connected to a steering column 20.

Figure 1:
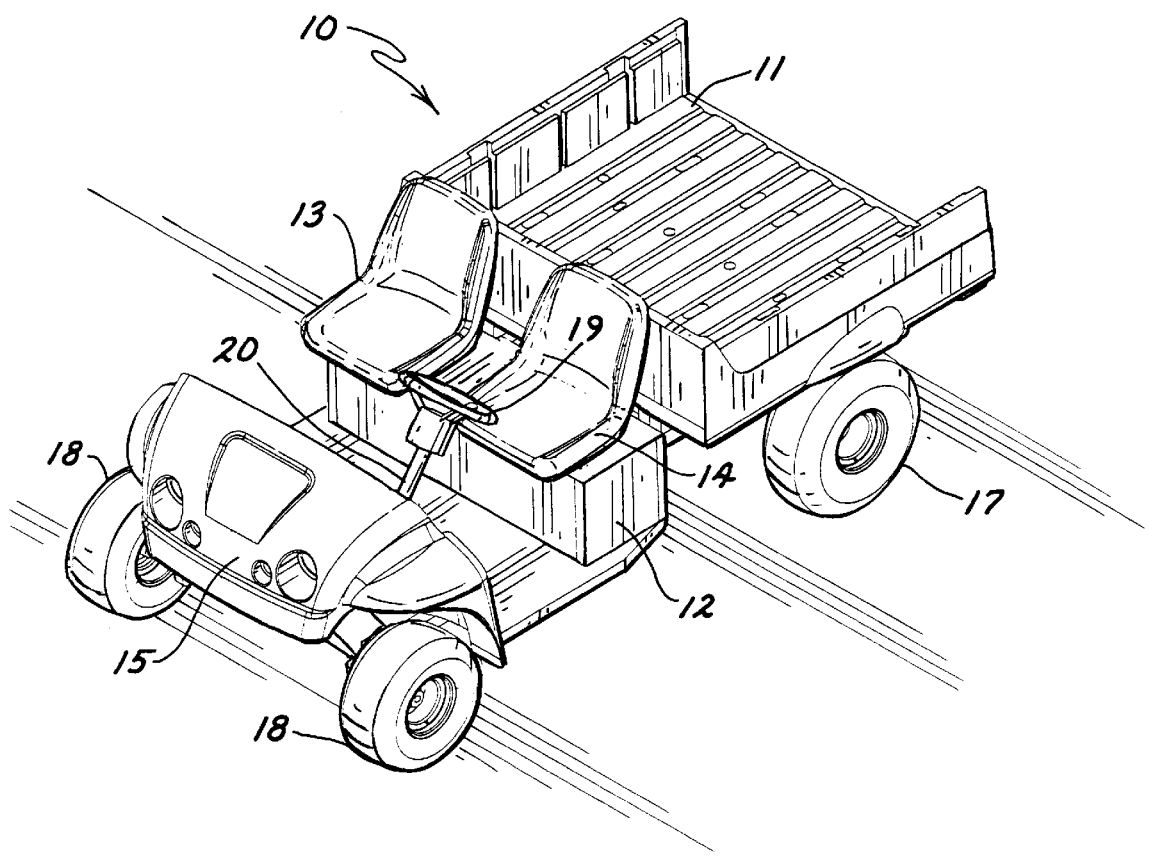
FIG. 1 is a perspective view of the utility vehicle of the present invention.

The rear frame 30 is preferably a single-piece weldment having left side 30a, rear section 30b, right side 30c and front member 30d. The left side 30a has an aperture 30e formed therein through which a muffler (not shown) is positioned. The axle 21 is operatively connected to the frame 30 by mounting member 31 which is welded to the axle 21 at one end and secured to the right side 30c by suitable means such as bolts and nuts 32. A similar mounting member (not shown) is utilized to secure the axle 21 to the left side 30a. As previously described, the payload platform 11 is operatively connected to the top of the frame 30. As shown in FIG. 1, the payload platform 11 includes a generally planar bed with three vertical sides. However, any suitable platform may be utilized. As previously stated, the platform is preferably hinged to provide for dumping.

The front frame 40 includes a longitudinal beam 45 which has a back frame member 43 welded thereto. The back frame member 43 is generally perpendicular to the longitudinal beam 45. Welded to the top of the longitudinal beam 45 is a floor board 41.

Figure 6:
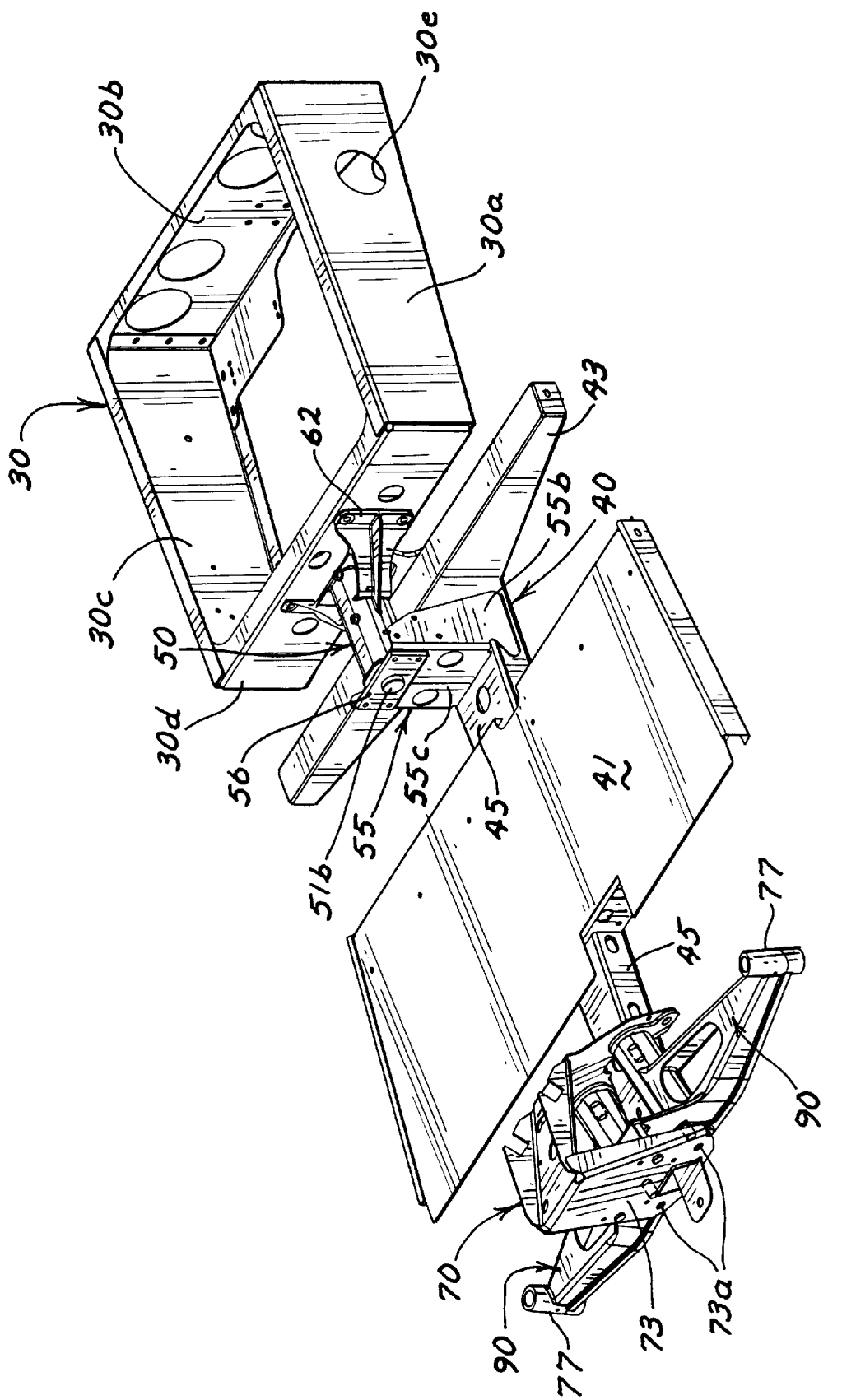
FIG. 6 is a perspective view shown generally from the front left of the frame of the vehicle of FIG. 1.
Figure 7:
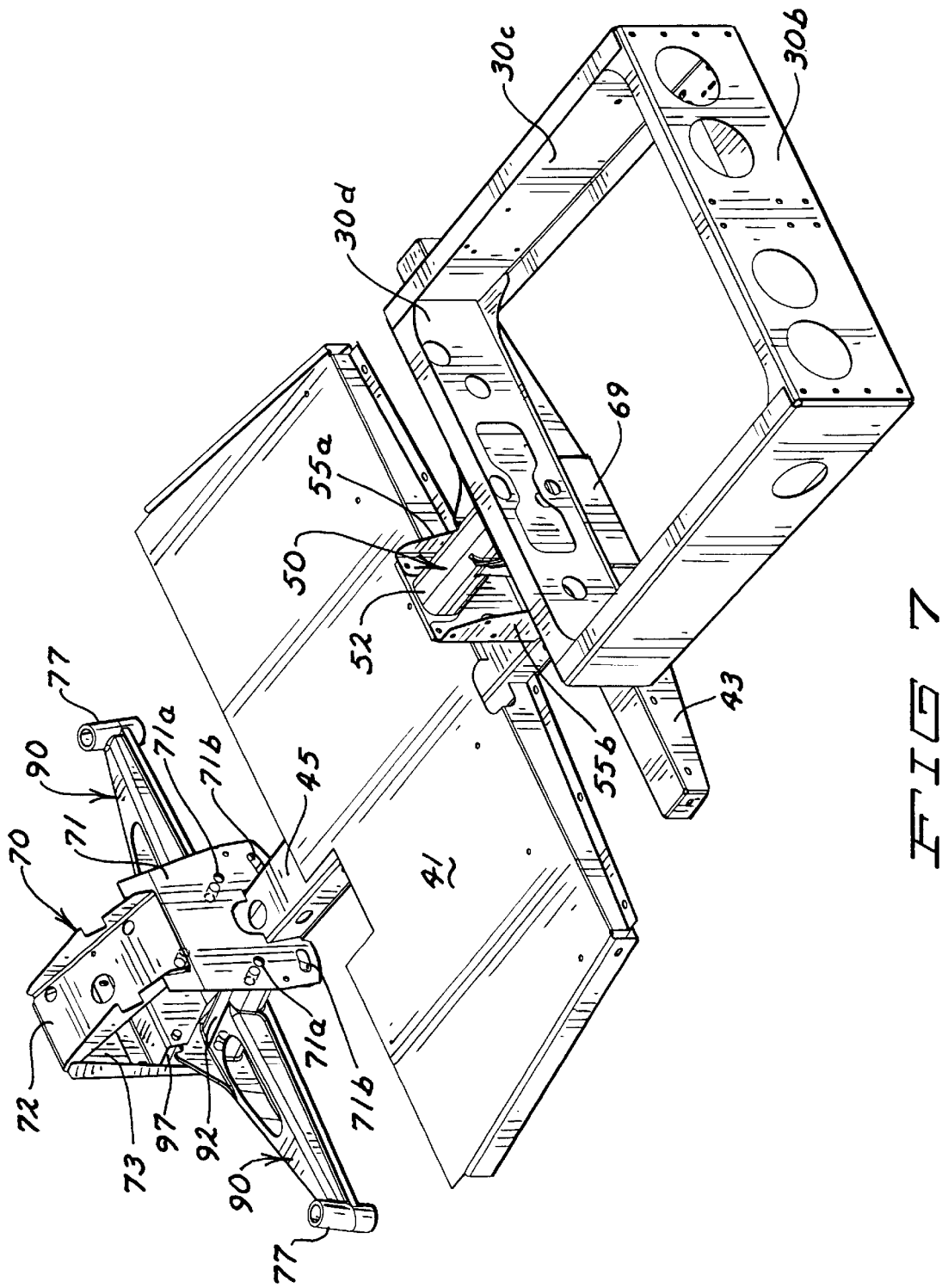
FIG. 7 is a perspective view of the frame of the vehicle shown in FIG. 1 shown generally from the left rear.
Figure 10:
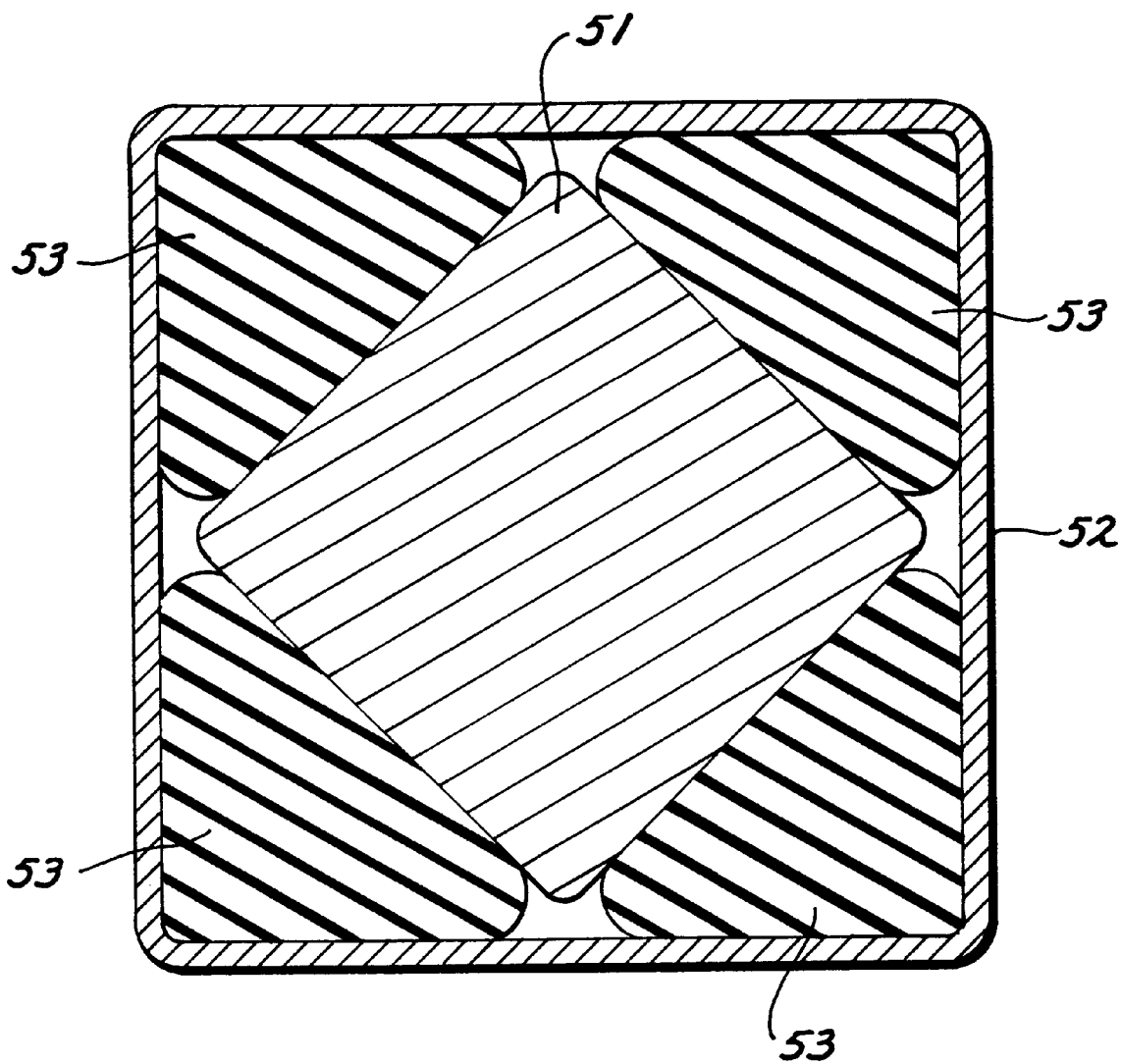
FIG. 10 is an enlarged cross-sectional view of the torsional joint used in the vehicle shown in FIG. 1.
Figure 11:
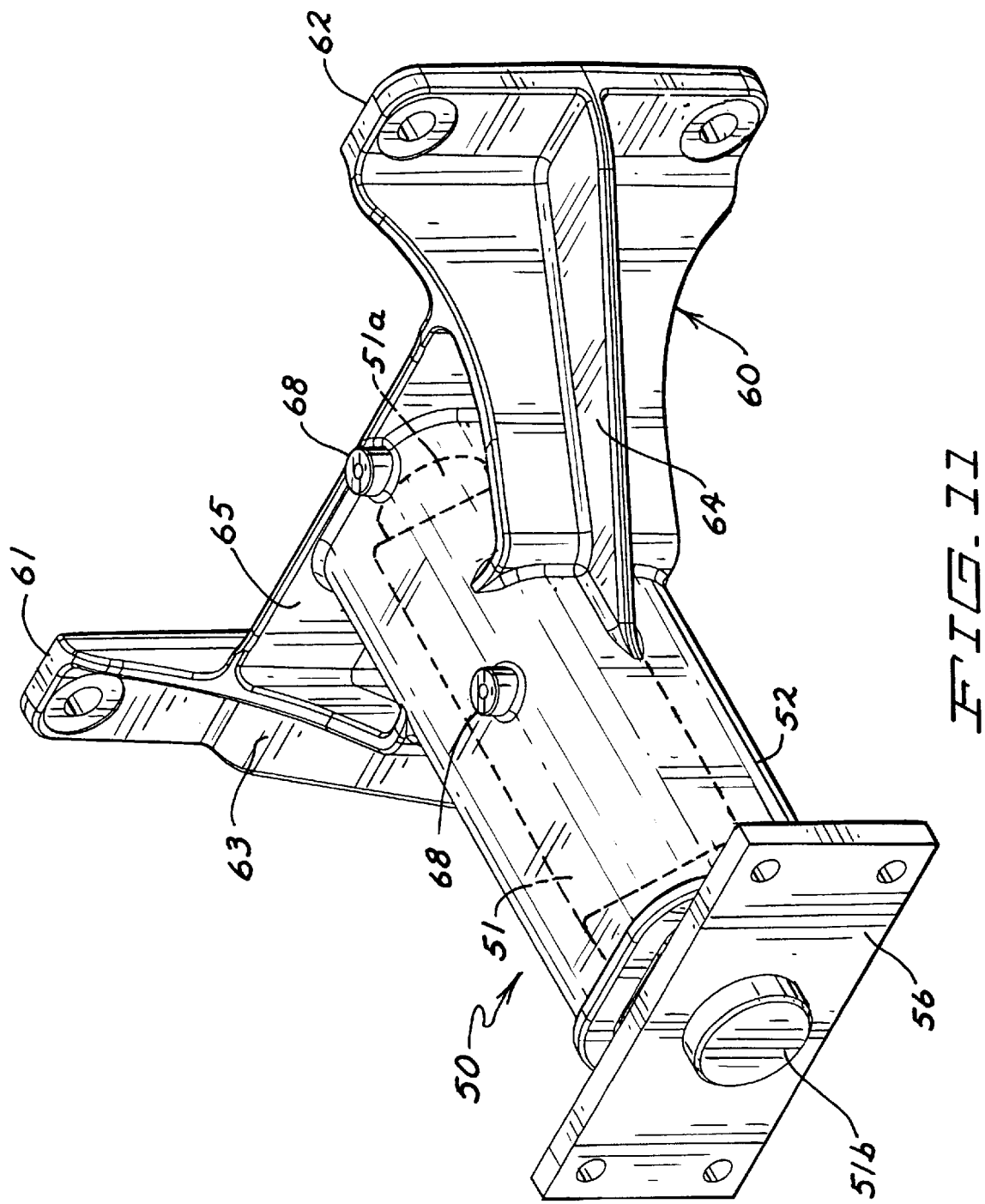
FIG. 11 is a perspective view of the torsional joint used in the vehicle shown in FIG. 1.

Referring to FIGS. 6, 7 and 11, there is shown a torsional joint, generally designated at 50. The torsional joint 50 connects the rear frame 30 to the front frame 40 along the center longitudinal axis of the vehicle 10. The torsional joint 50 includes an inner shaft member 51 and an outer hollow member 52. An elastomeric material 53 is positioned between the inner member 51 and outer member 52. The elastomeric material 53 operatively connects the inner member 51 to the outer member 52. As shown in FIG. 10, there are four elastomeric members 53. However, it is understood that the elastomeric members 53 may also take other configurations, such as completely surrounding the inner member 51. Such torsional members are known in the art, such as those described in U.S. Pat. No. 3,545,737. As will be described more fully hereafter, the inner shaft member 51 has a generally rectangular cross-section throughout its midsection, where it is in contact with the elastomeric material 53. At its ends are formed a first cylindrical shaft 51a and a second cylindrical shaft 51b. Plastic bearings (not shown) may be positioned between the shafts 51a and 51b and the outer member 52 to keep the inner shaft 51 concentric with the outer member 52. The shafts 51a and 51b are rigidly secured to the midsection of the inner shaft 51 and preferably are integral one-piece portion of the shaft member 51. The cylindrical ends 51a and 51b are utilized to more easily mount the torsional joint 50. As shown in FIG. 10, the inner shaft member 51 and outer hollow shaft member 52 have a generally rectangular cross-section and preferably a square cross-section.

The joint 50 is operatively connected to the front frame by a yoke 55 at one end and a support structure 60 at its other end. The yoke 55 includes a right side plate 55a and a left side plate 55b. A plate 55c is welded between the two side plates 55a and 55b. The yoke 55 is welded to the beam 45. Four bolt openings are formed in the back plate 55c. Also, the plate 55c at its top end has an opening which is sized slightly larger than the outer hollow member 52. A mounting plate 56 has four bolt openings formed therein. The bolt openings are in alignment with the bolt openings formed in the back plate 55c. A central aperture is formed in the mounting plate 56 and the shaft 51b is welded in the aperture. The plate 56 is mounted to the back plate 55c through the bolt holes by bolts and nuts (not shown). The support structure 60 includes a right plate 61 and a left plate 62. Both plates have two holes formed therein which are in alignment with two holes formed in the front member 30d of the rear frame for attachment by bolts and nuts (not shown). First and second arms 63 and 64 extend from the plates 61 and 62 at one end and are secured at the other ends, to the outer hollow member 52. A back member 65 extends between the plates 61 and 62 and has a central section which is connected to the end of the outer hollow member 52. The central section of the back member 65 has an opening through which the shaft 51a extends. The opening is large enough so that there is no interference between the back member 65 and the rotational movement of the shaft 51a. The outer hollow member 52 and support structure 60 are preferably formed as a single casting. Alternately, the components may be connected by suitable means such as welding. The back plates 61 and 62 are secured by bolts and nuts (not shown) to the front member 30d. This connects the outer hollow member 52 to the rear frame while the inner shaft member 51 is connected to the front frame. Additional support for the inner shaft member 51 is provided by a plate 69 which extends upward from the back of the rear member 43 and is welded thereto. The plate has an aperture which is sized and positioned to accept the shaft 51a.

Figure 14:
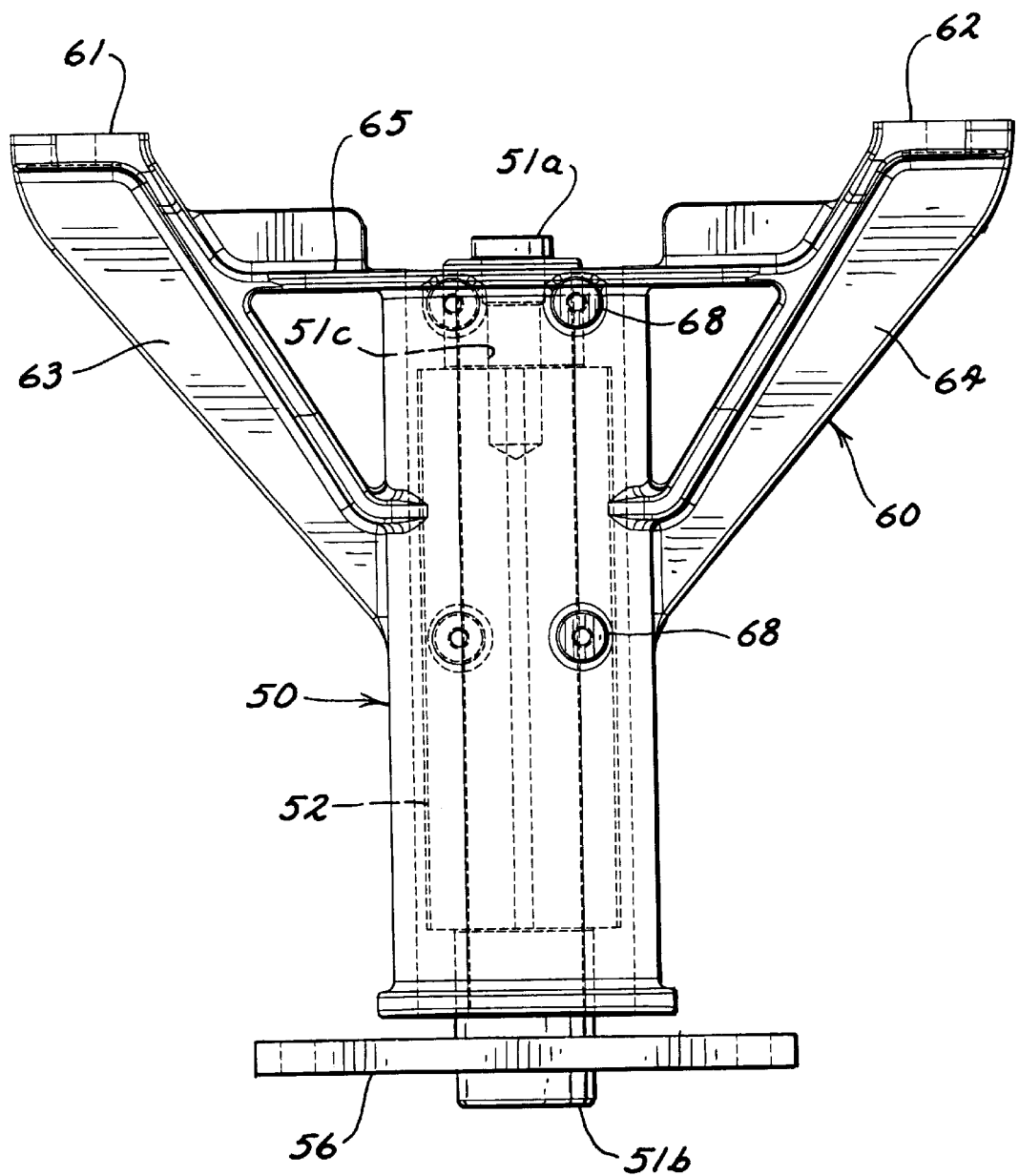
FIG. 14 is a top plan view of the torsional joint used in the vehicle shown in FIG. 1.

In viewing FIG. 14, it can be seen that the shaft 51a has a reduced diameter at its end. This is useful in nesting the shaft 51a in the frame. The reduction in diameter is what is supported by the plate 69. Further, a bore 51c is formed in the shaft 51. The bore 51c is sized to accept a bolt which extends through the plate 69 and further secures the shaft 51a to the front frame. The bosses 68 are formed in the outer hollow member 52 for possible additional use of providing guides for electrical wires and the like.

While the present invention has been described with respect to the outer hollow member 52 being connected to the rear frame and the inner shaft member 51 connected to the front frame, it is understood that one skilled in the art could reverse this so that the outer hollow member was connected to the front frame and the inner shaft member 51 connected to the rear frame.

Connected to the front portion of the beam 45 is a housing, generally designated at 70. The housing includes a rear member 71 connected to an inclined top member 72 which is in turn connected to a front member 73. The rear member 71 has two apertures 71a for mounting a torsional suspension member 90, which will be described in more detail hereafter. Two arcuate slots 71b are also formed at the bottom of the rear member 71 and are positioned proximate each side of the beam 45. The front member 73 also has two apertures 73a for mounting the torsional suspension member 90.

Figure 8:
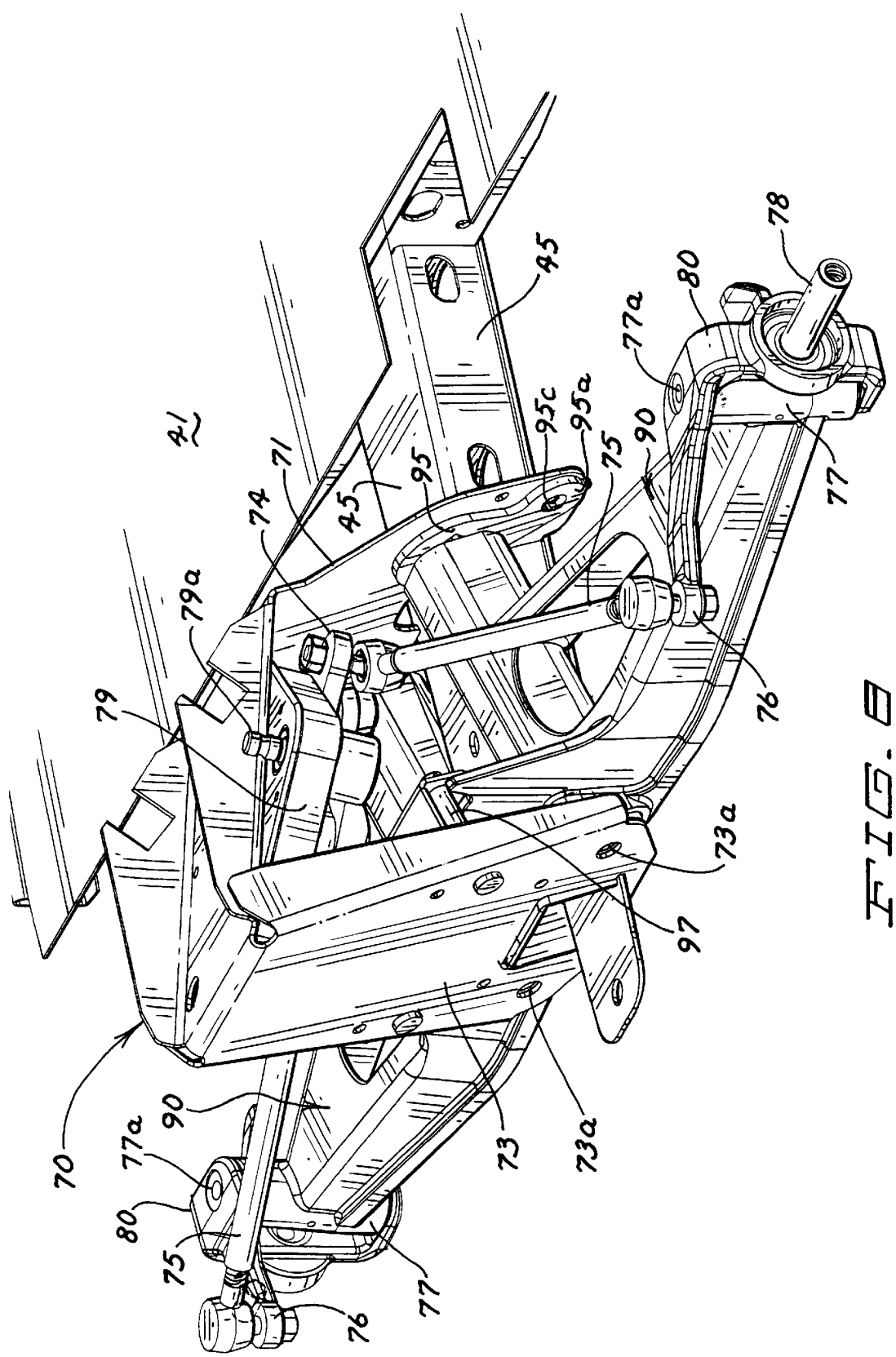
FIG. 8 is an enlarged perspective view shown generally from above of the suspension member of the vehicle shown in FIG. 1.
Figure 9:
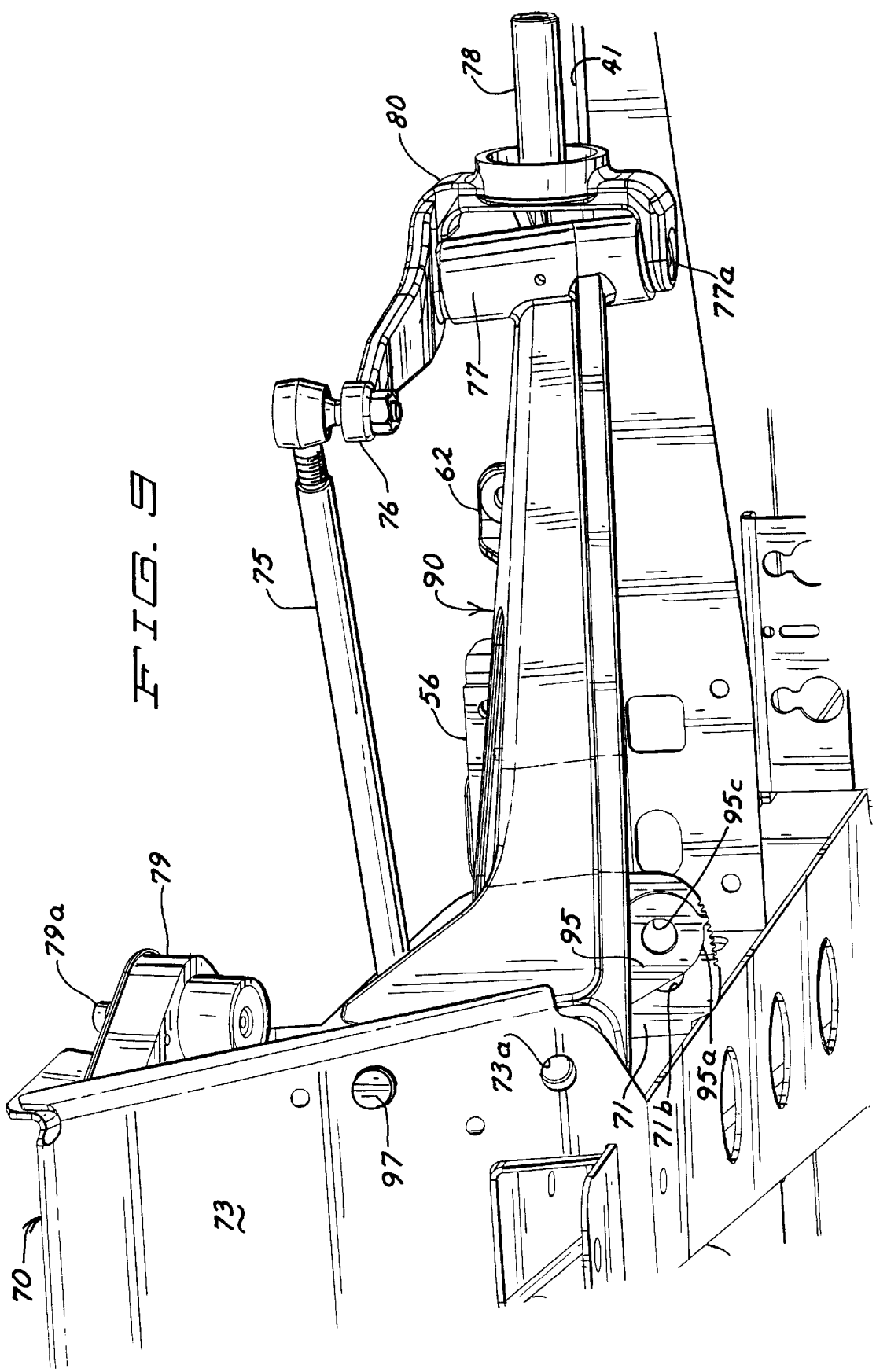
FIG. 9 is an enlarged perspective view of the suspension shown in FIG. 8, shown generally from in front.

The utility vehicle 10 includes a suitable steering mechanism, such as the one shown in FIGS. 8 and 9. However, it is understood that other suitable mechanisms may be utilized. The steering of the utility vehicle 10 is provided by a steering gear 79 which has an input shaft 79a which is operatively connected to the steering column 20 by means well known in the art. The steering gear 79 is operatively connected to a pitman arm 74 which is in turn connected to a tie rod 75. The other end of the tie rod 75 is connected to a steering arm 76 which is connected to a king pin 77a. The king pin 77a has a king pin pivot 77. A spindle 80 is operatively connected to the king pin 77a. The spindle 80 is operatively connected to a stub axle 78 on which a front wheel 18 is mounted. A similar arrangement is provided for the right front wheel 18.

Figure 12:
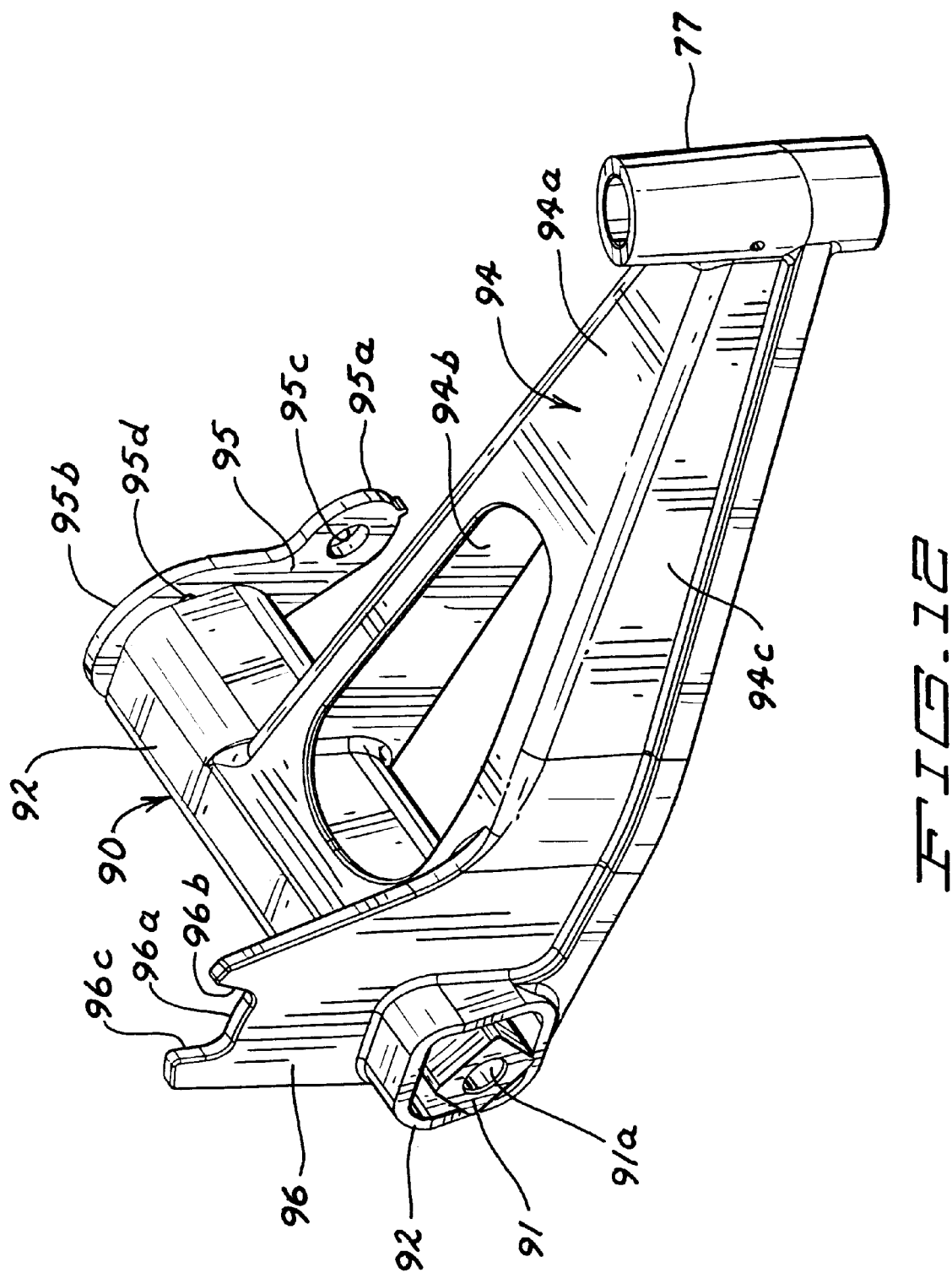
FIG. 12 is a perspective view of the suspension member used in the vehicle shown in FIG. 1.
Figure 13:
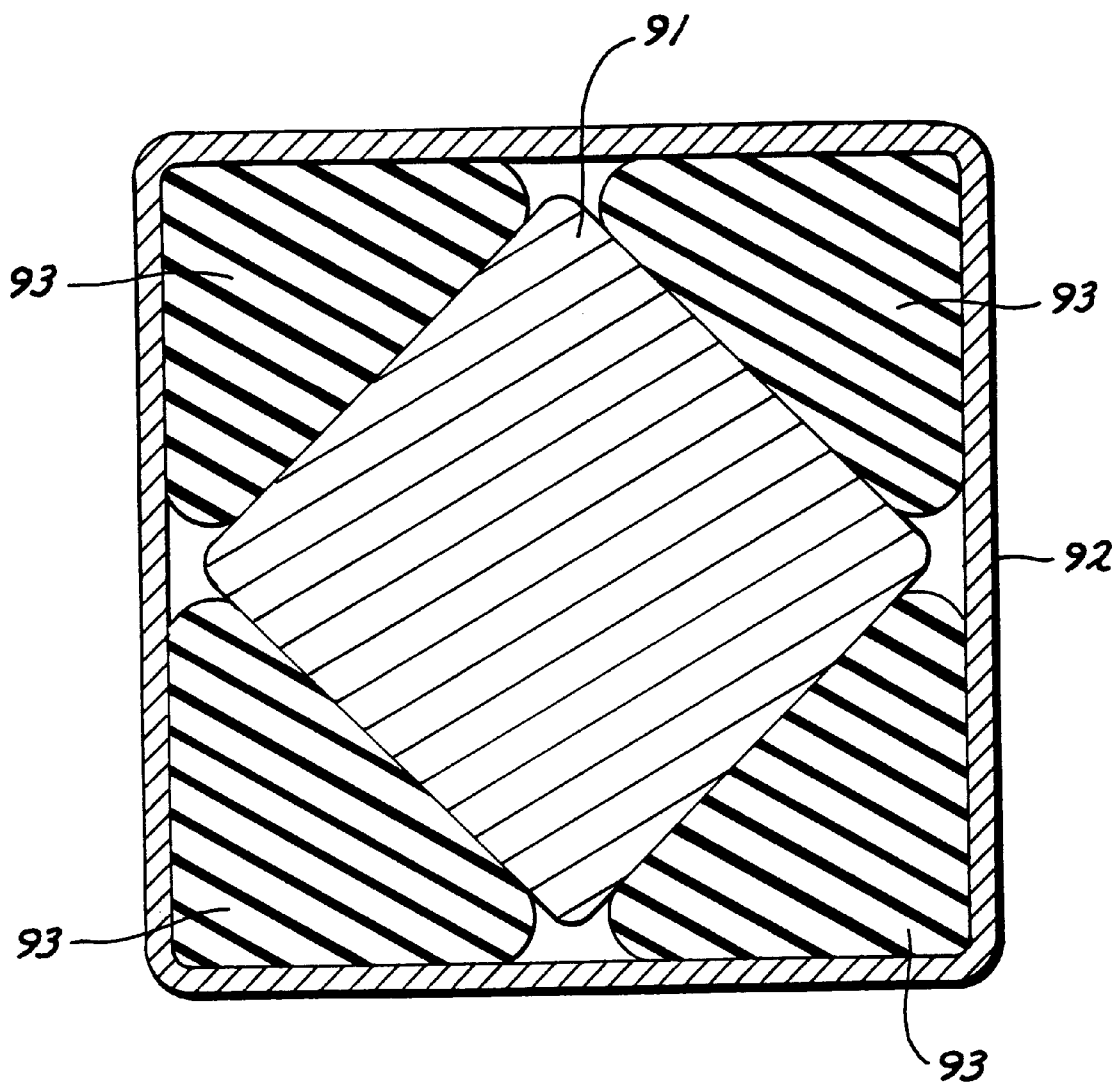
FIG. 13 is an enlarged cross-sectional view of the torsional suspension member shown in FIG. 11.

Two torsional suspension members 90 are provided for suspension of the front wheels 18. Only the left torsional suspension member 90 will be described in detail, as the other suspension member is similar. As seen in FIGS. 12 and 13, the torsional suspension member includes an inner shaft member 91 and an outer hollow member 92. An elastomeric material 93 is positioned between the inner member 91 and the outer member 92. The elastomeric material 93 operatively connects the inner member 91 to the outer member 92. As shown in FIG. 13, there are four elastomeric members 93. However, it is understood that the elastomeric members 93 may also take other configurations, such as completely surrounding the inner member 91. As can be seen, the torsional suspension member 90 is based on the same principle as the torsional joint 50. As shown in FIG. 13, the inner shaft member 91 and the outer hollow shaft member 92 have generally rectangular cross-sections and preferably have a square cross-section. Both ends of the inner shaft member 91 have a bore 91a which is tapped and threaded.

An A-frame member 94 connects the torsion suspension member 90 to the king pin pivot 77. The A-frame member 94 is a single member and includes a top member 94a, side member 94b and side member 94c, preferably formed as a single unitary piece, as a casting or by welding or other suitable methods. The A-frame member has one end welded to the outer hollow member 92 and the other end welded to the king pin pivot 77. The A-frame member 94 is a single member to provide for an A-frame connection between the suspension member 90 and the king pin pivot 77.

A lever arm 95 has a first end 95a and a second end 95b. An opening 95c is formed in the first end 95a. A rectangular opening 95d is formed in the second end 95b. The opening 95d is substantially hidden in FIG. 12 and only a corner of the opening is seen. However, the opening 95d is sized to be fitted over the end of the inner shaft 91. The opening 95d may be welded to the inner shaft member 91 or it may have a tight fit when slipped over the shaft member 91. An extension arm 96 has a first end welded to the side 94c and has a second end in which a notch 96a is formed, or as shown in FIG. 12 may be formed as an integral part of the A-frame 94. The notch 96a is formed between protrusions 96b and 96c. The extension arm 96 is welded to the outer hollow member 92. Another opening is formed in the front member 73 and a pin 97 is inserted therethrough. The opening is positioned so that the pin 97 is positioned in the notch 96a.

The torsional suspension element 90 is connected to the housing 70, and therefore the front frame, by two bolts (not shown) at each end of the inner shaft member 91. The bolts are inserted through the housing 70 and into the threaded openings 91a. The torsion suspension member is at a downward angle of about 15 degrees from the longitudinal axis of the vehicle 10. The 15 degrees is to allow for the proper steering geometry so that the steering may follow Ackerman's steering geometry. The first end 95a of the lever arm is also secured to the housing by means of a nut and bolt (not shown) which extends through the slot 71b and opening 95c. The amount of preloading of the suspension element 90 is adjustable by the position that the lever arm is secured in the arcuate slot 71b. The arcuate slot has the same radius as that of the pivoting lever arm. In adjusting the amount of loading on the suspension member 90, the bolts are loosened in the bores 91a of the inner shaft member 91 and the lever arm is secured in the desired rotational position by securing the bolt through slot 71b and opening 95c. Then the bolts are secured in position in the bores 91a of the inner shaft member 91 to secure the torsion suspension member 90 to the frame. While the slot 71b is shown as an arcuate slot, it is also envisioned that the slot may instead comprise a plurality of openings in an arcuate path. The openings or the slot may be calibrated with a numerical reference to indicate the amount of loading put on the suspension member 90. Therefore, if for example, a 400-pound plow is attached to the front end of the vehicle 10, the lever arm 95 could be rotated to the correct marking to compensate for the 400-pound load.

As can be seen, it is the inner shaft member 91 which is secured to the frame via the housing 70. The outer hollow member 92 is operatively connected to the A-frame and therefore the tire 18. Any movement of the tire 18 in a vertical position causes the A-frame member 94 to move up or down. This translates to a rotational movement of the outer hollow member 92, which movement is resisted by the elastomeric material 93. Further, the extension arm 96 with its notch 96a, in combination with the pin 97 prevent extreme movements of the tire in an up and down direction. As previously indicated, as the tire moves up and down, the outer wall 92 rotates either clockwise or counter-clockwise, depending upon the direction of the travel of the tire. The pin 97 is positioned in the notch 96a. The pin 97 will contact the protrusion 96b as the arm 96 rotates if the tire 18 moves upward too far. Similarly, if the tire 18 moves downward, the pin 97 would contact the protrusion 96c as the arm 96 rotates and limits movement in the downward direction.

While the inner member 91 is connected to the frame, it is appreciated by those skilled in the art that this could be reversed and the outer member 92 could be connected to the frame and the inner member 91 operatively connected to the king pin pivot 77 and therefore the tire 18.

The longitudinal axis of the suspension member 90 extends generally from the front to the rear of the vehicle 10. However, as previously discussed, it is at a slightly downward angle of approximately 15 degrees. The vertical plane which encompasses the longitudinal axis of the suspension member 90 is parallel to the vertical plane which would include the longitudinal axis of the vehicle 10.

Figure 3:
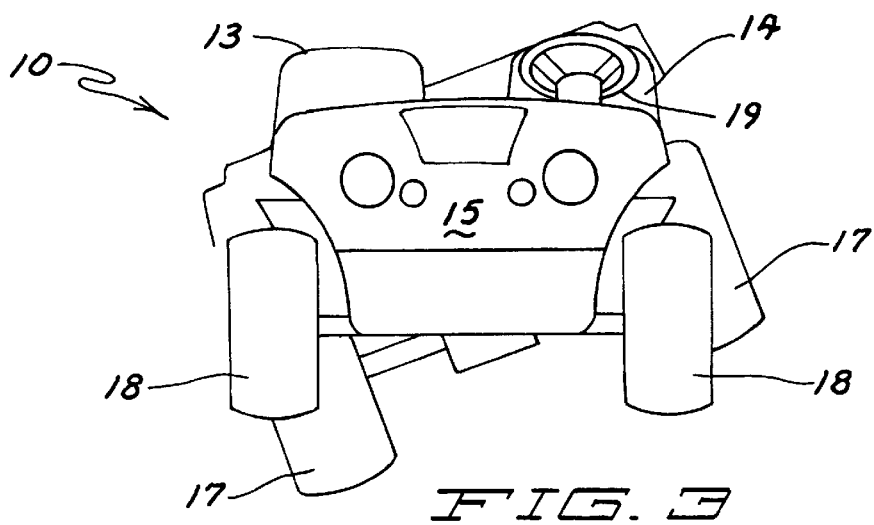
FIG. 3 is a front-end view of the vehicle of FIG. 1 showing the rear axle having its right side lowered.
Figure 4:
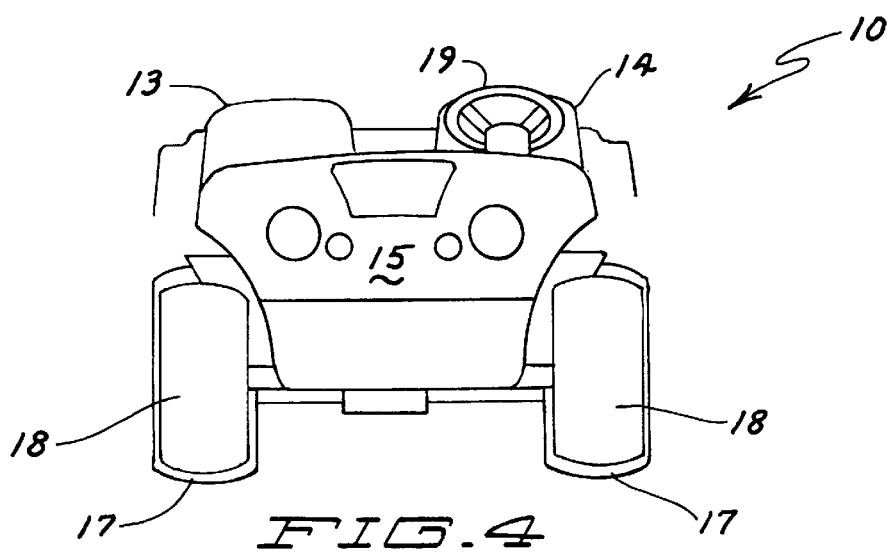
FIG. 4 is a front elevational view of the vehicle shown in FIG. 1 on level ground.
Figure 5:
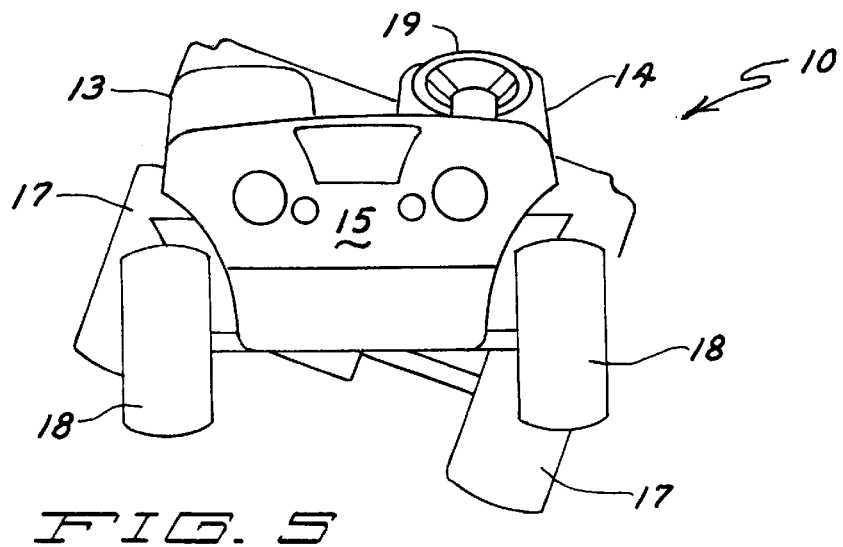
FIG. 5 is a front elevational view of the vehicle shown in FIG. 1 with the rear axle having its left end lowered.

In viewing FIGS. 3 through 5, the advantages of the torsional joint 50 are easily seen. FIG. 3 is a front view of the vehicle 10 as the right rear tire moves downward. The torsional joint 50 allows the rear frame 30 to rotate relative to the front frame 40 without the front frame 40 rotating. Therefore, the cab in which the operator sits is not subjected to the drastic movements of the rear frame 30.

FIG. 4 shows the utility vehicle 10 on level ground. FIG. 5 shows the reverse of FIG. 3. That is, FIG. 5 shows when the left rear tire goes downward and again the cab in which the operator sits is isolated from the movement of the rear frame 30. The cab is isolated from the heavy payload that may be carried by the rear frame.

This torsional joint 50 allows for better ground following by the wheels of the vehicle 10. All four wheels are kept on the ground in more instances which helps traction and stability. Further, the joint 50 works very well because it is a non-mechanical joint and there are no washers or spacers to wear. Because the elastic material is used for the resistance to rotation, there is nothing to adjust or loosen up as the joint 50 ages.

The suspension member 90 also provides for a simple suspension. The A-frame 94 is a single piece and there is not the need for an additional shock absorber or equivalent, as is required with the prior art. Typically, a spring or a shock is utilized with the prior art vehicles or a suspension system. When a spring or shock is utilized, it is necessary that the frame of the vehicle extend further upward so that the shock or spring may be secured at a point above the wheel. With the present invention, the frame does not have to extend up above the wheel to provide a place of attachment as the single simple A-frame member 94 is planar and is substantially the same height as the king pin pivot 77.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A utility vehicle having a longitudinal axis, comprising:
   (a) a front axle operatively connected to a front frame;
   (b) a rear axle operatively connected to a rear frame;
   (c) a torsional energy absorption member having an inner shaft member, an outer hollow member and an elastomeric material operatively connecting the inner and outer members;
   (d) an A-frame having a first end operatively connected to a wheel and a second end operatively connected to said inner shaft or outer hollow member, the other of said inner shaft or outer hollow member operatively connected to one of the frames;
   (e) a lever arm having a first end operatively connected to the other of said members and a second end connected to said one of the frames; and
   (f) the second end of the lever arm secured in one of a plurality of positions on said one of the frames, said one of the frames having an arcuate opening fanning an arc, the arc having a first radius and the lever arm having a length where the lever arm is connected to the frame, the length being the same as the first radius, wherein a varying preload may be created by simply securing the lever arm to a different position;
   (g) a torsional joint having an inner shaft member operatively connected to one of said frames and an outer hollow member operatively connected to the other of said frames; and
   (h) an elastomeric material positioned between the inner and outer members of the torsional joint, the elastomeric material operatively connecting the inner and outer members, whereby said frames may rotate relative to each other along the longitudinal axis as the elastomeric member is compressed and resiliently resists rotation between the frames.

2. The vehicle of claim 1, further comprising an operator platform operatively connected to the front frame and a payload platform operatively connected to the rear frame, wherein the operator platform is isolated from rotational movement of the rear frame except through the joint.

3. A utility vehicle having a longitudinal axis, comprising:
   (a) a front axle operatively connected to a front frame;
   (b) a rear axle operatively connected to a rear frame;
   (c) a torsional energy absorption member having an inner shaft member, an outer hollow member and an elastomeric material operatively connecting the inner and outer members;
   (d) an A-frame having a first end operatively connected to a wheel and a second end operatively connected to said inner shaft or outer hollow member, the other of said inner shaft or outer hollow member operatively connected to one of the frames;
   (e) a lever arm having a first end operatively connected to the other of said members and a second end connected to said one of the frames;
   (f) the second end of the lever arm secured in one of a plurality of positions on said one of the frames, wherein a varying preload may be created by simply securing the lever arm to a different position;
   (g) a torsional joint having an inner shaft member operatively connected to one of said frames and an outer hollow member operatively connected to the other of said frames; and
   (h) an elastomeric material positioned between the inner and outer members of the torsional joint, the elastomeric material operatively connecting the inner and outer members, whereby said flumes may rotate relative to each other along the longitudinal axis as the elastomeric member is compressed and resiliently resists rotation between the frames.

4. The vehicle of claim 3, further comprising an operator platform operatively connected to the front frame and a payload platform operatively connected to the rear frame, wherein the operator platform is isolated from rotational movement of the rear frame except through the joint.

* * * * *

UNITED STATES PATENT AND TRADEMARK OFFICE
CERTIFICATE OF CORRECTION

PATENT NO.    : 6,354,615
DATED         : March 12, 2002
INVENTOR(S)   : Kip S. Vangsgard et al.

It is certified that error appears in the above-identified patent and that said Letters Patent is hereby corrected as shown below:

Column 3,
Line 11, delete "filly" and insert therefore -- fully --.

Column 7,
Line 58, delete "fanning" and insert therefore -- forming --.

Column 8,
Line 49, delete "flumes" and insert therefore -- frames --.

Signed and Sealed this

Twenty-first Day of May, 2002

Attest:

JAMES E. ROGAN
Attesting Officer  Director of the United States Patent and Trademark Office